May 4, 1965 G. M. MEJLSO 3,181,411
FASTENERS
Filed Aug. 23, 1963 2 Sheets-Sheet 1
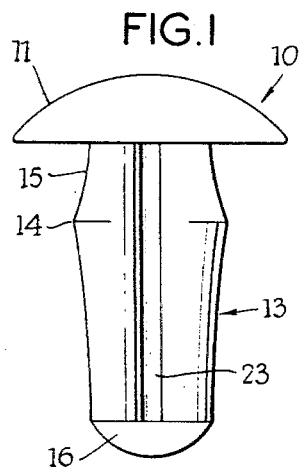
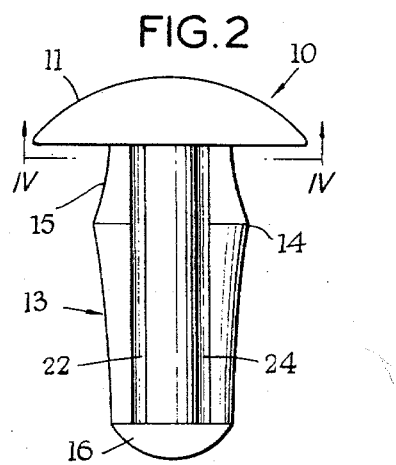
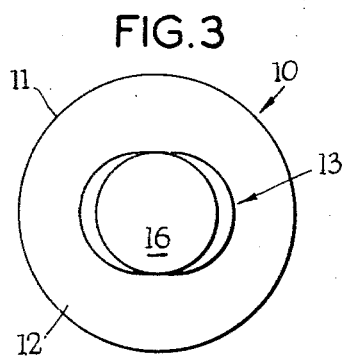
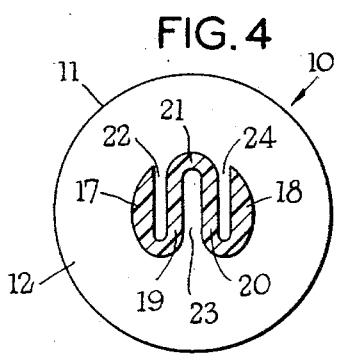
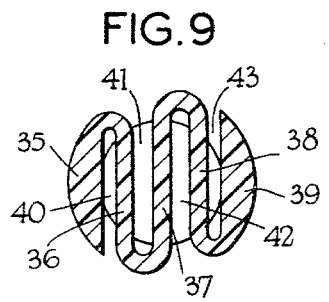
INVENTOR:
GEORGE MONTAGUE MEJLSO,
BY
ATT'Y.

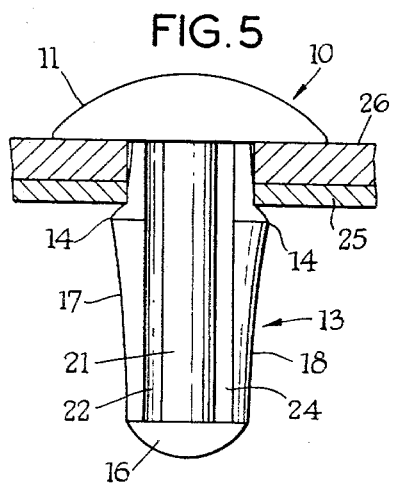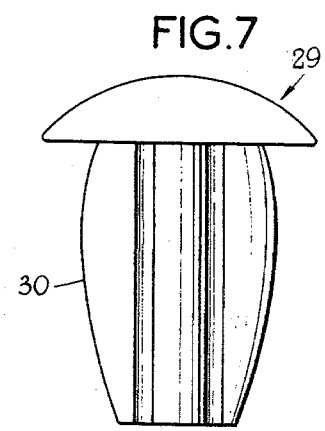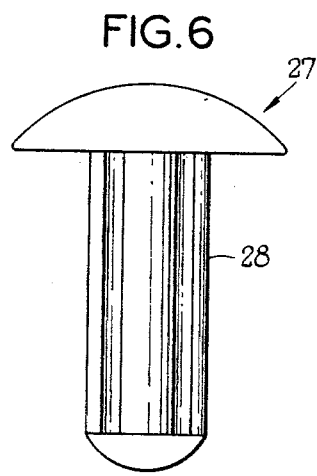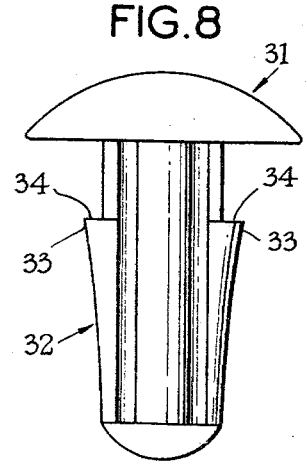

United States Patent Office 3,181,411
Patented May 4, 1965

3,181,411
FASTENERS
George Montague Mejiso, Hounslow, England, assignor to United-Carr Incorporated, a corporation of Delaware
Filed Aug. 23, 1963, Ser. No. 304,112
Claims priority, application Great Britain, Aug. 31, 1962, 33,596/62
3 Claims. (Cl. 85—5)

The present invention relates to an improved fastener which is particularly although not exclusively suitable for securing together two apertured members.

According to the invention there is provided a one-piece fastener made of a resilient material and comprising a shank and an enlarged head, the head having a clamping surface adjacent the shank and the shank being substantially W-shaped in transverse section over at least a major part of its length.

According to another aspect of the invention there is provided a one-piece fastener made of a resilient material and comprising a shank and an enlarged head, the shank comprising, in transverse section over a major part of its length; a U-shaped portion having a web and two limbs each of which is extended and reversely bent.

According to a further aspect of the invention there is also provided a one-piece fastener made of a resilient material and comprising a shank and an enlarged head, the shank being, in transverse section over a major part of its length, substantially circular and formed with three longitudinal slots, one of which contains the axis of the shank and opens out of the shank on one of its sides and the other two of which are disposed one on either side of the one slot and open out of the other side of the shank.

Preferred forms of the invention will now be described with reference to the accompanying diagrammatic drawings, in which:

FIGURES 1, 2 and 3 are respectively a front elevation, rear elevation and plan view of a fastener according to the invention, FIGURE 4 is a section on the line IV—IV of FIGURE 2, FIGURE 5 is a rear elevation, partly in section, of the fastener of FIGURES 1 to 3 holding two apertured panels together, FIGURES 6, 7 and 8 are elevations showing three modifications of the fastener of FIGURES 1 to 3, and FIGURE 9 illustrates another modification.

In FIGURES 1 to 4 there is indicated generally at 10 a fastener which is moulded to the shape shown from any suitable material such as a synthetic resin.

The fastener 10 has an enlarged head 11, which externally is in the shape of a segment of a sphere and internally has a dished underface 12, and a shank 13 which extends downwardly from the dished face 12.

The shank 13 is formed with external shoulders 14, a neck portion 15 between the shoulders 14 and the head 11 and a closed, solid tip 16.

As best seen from FIGURE 4, on any transverse section taken through the shank in the region between the tip 16 and the head 11 the shank is substantially of W-shape. Thus it has a U-shaped portion comprising two limbs 19 and 20 joined by a web 21 and two reversely bent extensions 17 and 18, of the limbs 19 and 20 respectively, which constitute the outer side walls of the shank.

As shown in FIGURE 3, the shank 13 is substantially circular in section at the tip 16. The shoulders 14 are formed on the extensions or side walls 17 and 18 and consequently in the region of the shoulders 14 the shank is substantially oval in section.

It will be seen that by virtue of its shape the shank 13 has three longitudinal slots 22, 23 and 24. The slot 23 includes the axis of the shank 13 and opens out of one side of the shank and the slots 22 and 24 are located one on each side of the slot 23 and open out of the other side of the shank 13.

The fastener 10 may be used, as shown in FIGURE 5, to secure an apertured panel 25 to an apertured support 26.

Both the support and the panel are formed with circular apertures each of a diameter approximately equal to the maximum cross-sectional dimension of the shank 13 immediately adjacent the head 11.

In order to make the assembly the panel is brought up to the support and the apertures are aligned. The shank of the fastener 10 is then forced through the apertures so that it is compressed and the shoulders 14 on the shank are passed through both the support and the panel so as to engage the undersurface of the panel and pull the head of the fastener down tightly on to the support.

In the assembled position the neck 15 of the shank is under slight compression and the panel and support are pinched firmly between the head 11 of the fastener and the shoulders 14. The underface 12 of the head is held in clamping engagement against the support 26 and this makes a substantially air- and water-tight seal of the aperture in the support.

FIGURES 6, 7 and 8 illustrate three further modifications of the invention and in each case the fastener illustrated is similar to the fastener 10, described with reference to FIGURES 1 to 4, except that, in FIGURE 6 a fastener 27 is shown with a substantially cylindrical straight sided shank 28, in FIGURE 7 a fastener 29 is shown having an externally barrel-shaped shank 30 and in FIGURE 8 a fastener 31 is shown having a shank 32 formed with shoulders 33 intermediate its length.

The fastener 27 is used in the same manner as the fastener 10 and is intended for use in a circular aperture or apertures of slightly smaller cross-sectional dimensions than the shank 28. Thus, as the shank is forced into the apertures it is compressed and its resilience provides a grip on the rim of the aperture through which it extends. The fastener 27 has the advantage that it is more easily removable from an aperture than the fastener 10 but does not provide as strong a fastening.

The fastener 29 provides a stronger fastening than the fastener 27 of FIGURE 6 by virtue of its external barrel shape which constitutes a form of shouldering on the shank.

The shoulders 33 on the shank 32 of the fastener 31 have surfaces 34 which extend substantially at right angles to the general direction of the shank 32 and which form clamping surfaces for engagement against the undersurface of a panel or support in which the fastener is engaged.

When assembled in an aperture the fastener 31 cannot be withdrawn because of the shoulders 33 and is positively locked in the aperture.

All of the fasteners described above have shanks which are of W-shape in cross-section, that is to say the shank consists of four limbs (see FIGURE 4) which are approximately parallel and are formed together so as to enclose three slots.

As shown in FIGURE 9, however, the shank may have more than four limbs for example five limbs 35, 36, 37, 38 and 39 formed together so as to enclose four slots 40, 41, 42 and 43 respectively.

It will be appreciated that any of the fasteners illustrated and described herein may be used to attach two or more apertured members together or they may be used as a plug or closure device for an aperture in a panel.

In every case the neck portion of the shank of the fastener adjacent the head may be solid and the tip of the shank may be left open so that the longitudinal slots run out of the free end of the shank.

Additionally the head of each fastener described herein may be modified in shape, for instance the head may be formed with opposed outwardly sloping surfaces for engaging a strip beading in a well known and conventional manner, or it may be formed with one or more resilient cable holding arms.

What I claim is:

1. A one piece fastener formed of a resilient material, such as synthetic plastic, comprising an elongated shank having an axis, adapted for insertion in an aperture in a support and an enlarged head, the head providing a surface for engagement with a surface of the support and said shank including a substantially W-shaped portion having a plurality of longitudinal slots of substantial depth defining axially extending, flexible, spaced apart limb sections therebetween, said limb sections having axially extending side surfaces in substantially parallel relation, to each other and to said shank axis along the major portion of their lengths, each limb section being connected to each adjacent limb section by a relatively thin U-shaped portion lying between said limb sections whereby adjacent slots open on diametrically opposite sides of said shank.

2. A fastener as set forth in claim 1 wherein the shank has a closed solid tip.

3. A fastener as set forth in claim 2 wherein the said shank has a circumferential shoulder intermediate its length for cooperative engagement with the said surface on the head of said fastener.

References Cited by the Examiner

UNITED STATES PATENTS

| | | | |
|---|---|---|---|
| 2,853,913 | 9/58 | Rapata | 85—5 |
| 2,909,957 | 10/59 | Rapata | 85—5 |
| 3,093,027 | 6/63 | Rapata | 85—5 |
| 3,093,874 | 6/63 | Rapata | 85—5 |
| 3,104,430 | 9/63 | Badali | 85—8.3 |

FOREIGN PATENTS 962,483    4/57   Germany.

EDWARD C. ALLEN, *Primary Examiner.*